United States Patent
Brenot et al.

(10) Patent No.: US 6,214,753 B1
(45) Date of Patent: Apr. 10, 2001

(54) LAYERED COMPOSITE CONSTRUCTION MATERIAL MADE FROM FINESPUN FILAMENTS OF GLASS

(76) Inventors: Stephen E. Brenot, Rte. 6 Box 114, Fergus Falls, MN (US) 56537; Arnold G. Althoff, 16870 County Rd. 16, Hankinson, ND (US) 58041; Randy M. Schneider, 20 7th St. South #501, Fargo, ND (US) 58103

( * ) Notice: Subject to any disclaimer, the term of this patent is extended or adjusted under 35 U.S.C. 154(b) by 0 days.

(21) Appl. No.: 09/148,891

(22) Filed: Sep. 8, 1998

(51) Int. Cl.[7] ............................. B32B 17/12; B32B 31/10
(52) U.S. Cl. ..................... 442/225; 442/224; 442/269; 442/283; 428/86; 428/119; 428/219
(58) Field of Search .................. 428/86, 89, 102, 428/119, 219; 442/224, 225, 269, 283

(56) References Cited

U.S. PATENT DOCUMENTS

| | | |
|---|---|---|
| 4,228,208 * | 10/1980 | Smith et al. . |
| 4,386,983 * | 6/1983 | Hipchen et al. . |
| 4,463,043 * | 7/1984 | Reeves et al. . |
| 4,568,593 * | 2/1986 | Green . |
| 4,680,214 * | 7/1987 | Frisch et al. . |
| 4,927,684 * | 5/1990 | Asensio et al. . |
| 4,983,442 * | 1/1991 | Patel et al. . |
| 5,667,866 * | 9/1997 | Reese, Jr. . |
| 5,741,574 * | 4/1998 | Boyce et al. . |

* cited by examiner

Primary Examiner—Deborah Jones
Assistant Examiner—Jason Savage
(74) Attorney, Agent, or Firm—David A. Lingbeck

(57) ABSTRACT

A layered composite construction material includes a pair of outer layers of material including essentially continuous strand fiberglass mat which are separated by a pair of intermediate sandwich layers of material each being adjacent to a respective outer layer of material and including essentially eighteen ounce woven roving fiberglass mat and which are further separated by at least one internal layer of material which essentially includes spun fiberglass blanket which has fiberglass strands longitudinally disposed perpendicular to the other layers of material for facilitating even dispersal of a foam throughout all the layers of material to effectively secure and bind the layers of material. The internal layer of material can also include multiple layers of spun fiberglass mat each of which are separated by a pair of layers of material. The layered composite construction material is quite useful as a building component in building structures, in rail cars, in boats, in campers, and is quite useful as a substitute for the use of wood, metal, and cement. This construction material has an indefinite lifespan.

14 Claims, 4 Drawing Sheets

LAYERED COMPOSITE CONSTRUCTION MATERIAL MADE FROM FINESPUN FILAMENTS OF GLASS

BACKGROUND OF THE INVENTION

This invention relates to a layered composite construction material which can be shaped and formed for use throughout the marine, transportation, and building industries and which essentially reduces the reliance on wood and metal for certain products which are traditionally made out of such materials. This construction material has been proven to be stronger than plywood and other types of wood and is waterproof and quite resistant to expansion due to changes in the temperature.

For years, certain types of building materials traditionally have been made out of wood, plastics, steel or metal, and cement can be replaced with the present invention which also can be used in other industries. The prior art illustrates the use of other materials which can be used as building materials and other useful products.

One known prior art include PREFAB PANELS AND SYSTEM FOR BUILDING CONSTRUCTION, U.S. Pat. No. 4,154,030, issued on May 15, 1979 and invented by Rafael R. Hugue, which comprises a plurality of columns and beams adapted to one another to form a rigid load-bearing structural frame and a plurality of inexpensive lightweight non-load-bearing panels spanning the frame components, the panels comprising a main portion of molded waste material and a resinous binder forming a polymer and the minor portion of open cell material in spaced parallel cylindrical shafts embedded within the main portion of molded waste material.

Another known prior art includes A WALL MATERIAL AND METHOD OF PREPARING A WALL MATERIAL OF SOILS AND VEGETABLE MATERIALS, U.S. Pat. No. 4,947,611, issued on Aug. 14, 1990 and invented by Michlo Otsuka and which comprises pulverized straw, pulverized chaff and pulverized palm material all of which are mixed with a substantially equal quantity of clay and added to a fibrous material. This mixture is poured into a form and then dried.

Another known prior art includes a HIGHLY FILLED SUBSTANTIALLY SOLID POLYURETHANE, UREA AND ISOCYANNURATE COMPOSITES FOR INDOOR AND OUTDOOR APPLICATION FOR LOAD BEARING, STRUCTURAL AND DECORATIVE PRODUCTS, U.S. Pat. No. 5,053,274, issued on Oct. 1, 1991 and invented by Arthur E. Jonas and which comprises a mixture of solid polyurethane, polyisocyanurate and/or polyurea binder with a preponderance of a solid or liquid filler.

Another known prior art includes REINFORCED FOAM CORES AND METHOD AND APPARATUS OF PRODUCTION, U.S. Pat. No. 5,589,243, issued on Dec. 31, 1996 and invented by Stephen W. Day and which comprises rigid foam boards and alternating fibrous web sheets adhered to form core panels or billets wherein the web sheets have porous openings through which resin is filled.

Another known prior art is a METHOD OF PRODUCTION OF REINFORCED FOAM CORES, U.S. Pat. No. 5,462,623, issued on Oct. 31, 1995 and invented by Stephen W. Day and which comprises rigid foam insulation boards and thin flexible fibrous sheets or strips stacked in alternating layers with adhesive between the layers and the stack being compressed while the adhesive cures to form a rectangular core panel or billet.

None of the prior art discloses or suggests a perfectly layered construction material which comprises many differently constructed and/or configured fiberglass layers which are bonded together with a rigid foam to essentially form highly useable construction material which serves as a replacement of many products traditionally made of wood, plastics, or metal.

SUMMARY OF THE INVENTION

The present invention comprises a pair of distinct outer layers of material essentially comprising continuous strand fiberglass mats which are separated by a pair of distinct intermediate sandwich layers of material each of which is adjacent to a respective one of the outer layers of material and essentially comprises eighteen ounce woven roving fiberglass mat and which is further separated by at least one distinct internal layer of material which is sandwiched between the intermediate sandwich layers and which comprises a layer of spun fiberglass blanket with all the layers being bonded with a foam which is dispersed throughout the layers. This construction material can be used to replace wood products such as plywood and even metal products and cement.

One objective of the present invention is to provide a layered composite construction material which is ultra lightweight as compared to similarly sized plywood or metal structural components.

Another objective of the present invention is to provide a layered composite construction material which is waterproof and resistant to salt and chemicals.

Also, another objective of the present invention is to provide a layered composite construction material which is stronger than that of similar sized plywood.

Further, another objective of the present invention is to provide a layered composite construction material which has a higher insulation value of approximately 14 times greater than that of plywood.

Yet, another objective of the present invention is to provide a layered composite construction material which has a closed cell structure for eliminating bacterial penetration and contamination.

Further objectives and advantages of the present invention will become apparent as the description proceeds and when taken in conjunction with the accompanying drawings wherein:

DETAILED DESCRIPTION OF THE INVENTION

Figure 1:
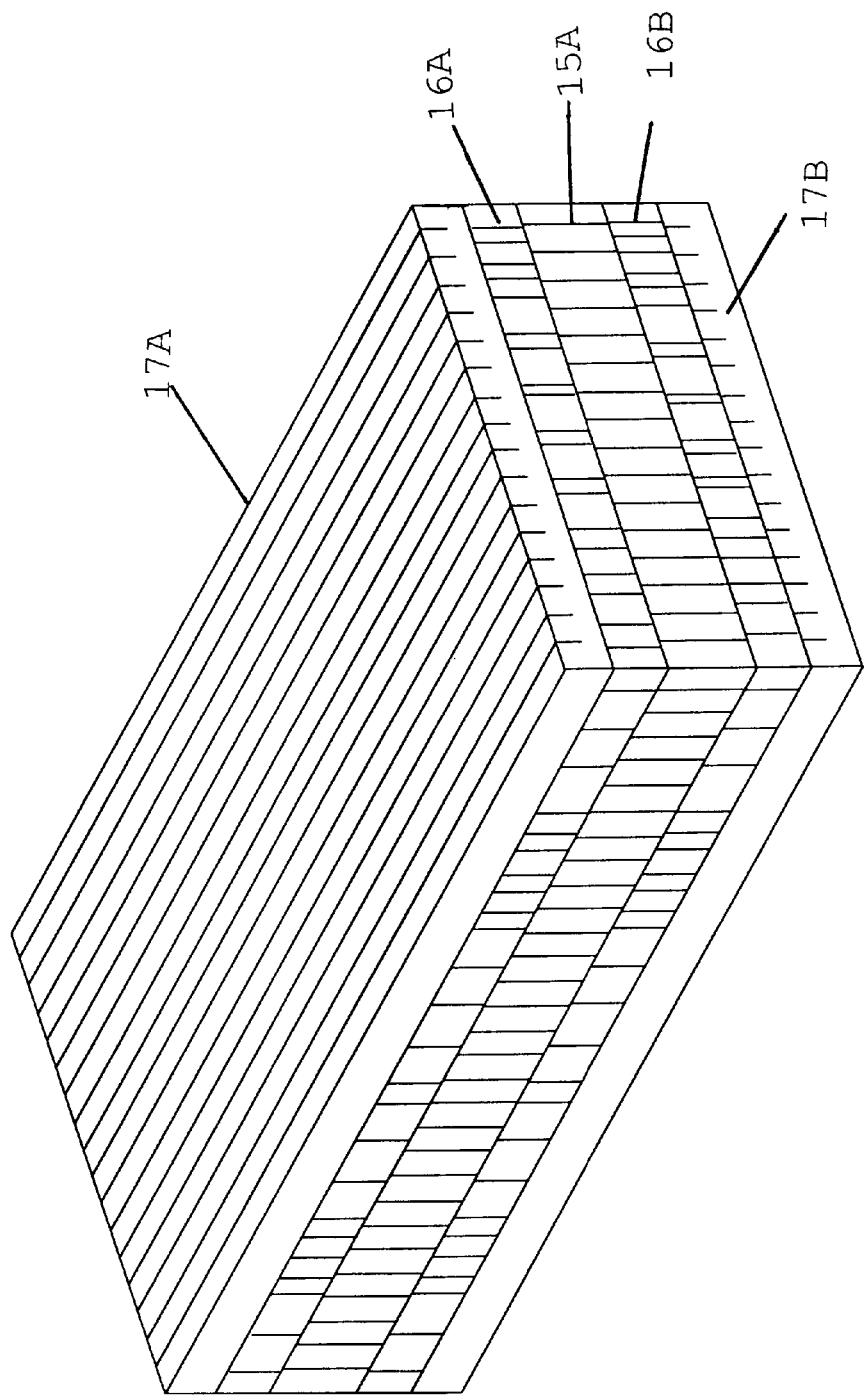
FIG. 1 is a perspective view of the preferred embodiment of the layered composite construction material.
Figure 2:
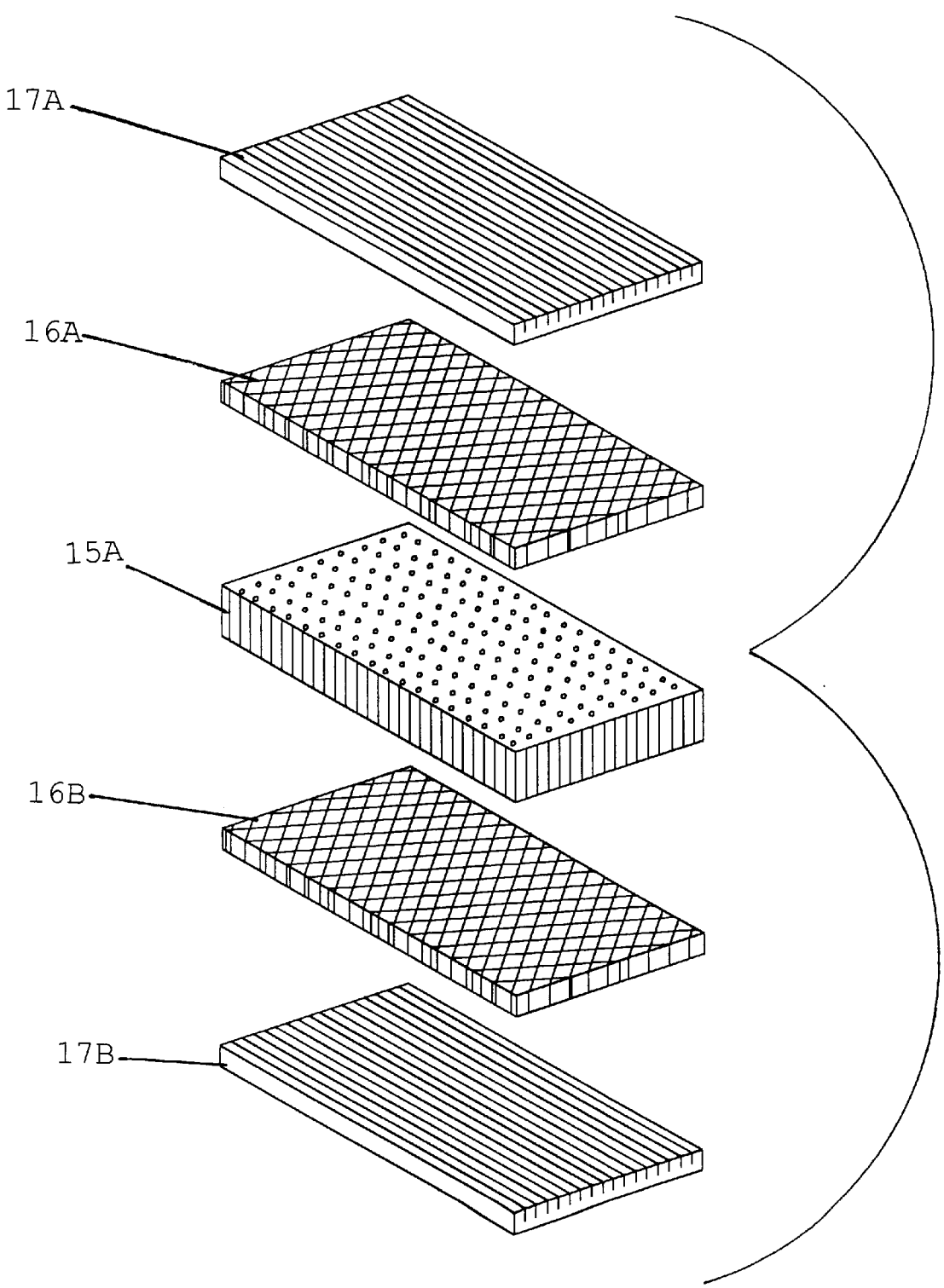
FIG. 2 is an exploded perspective view of the preferred embodiment of the layered composite construction material.
Figure 3:
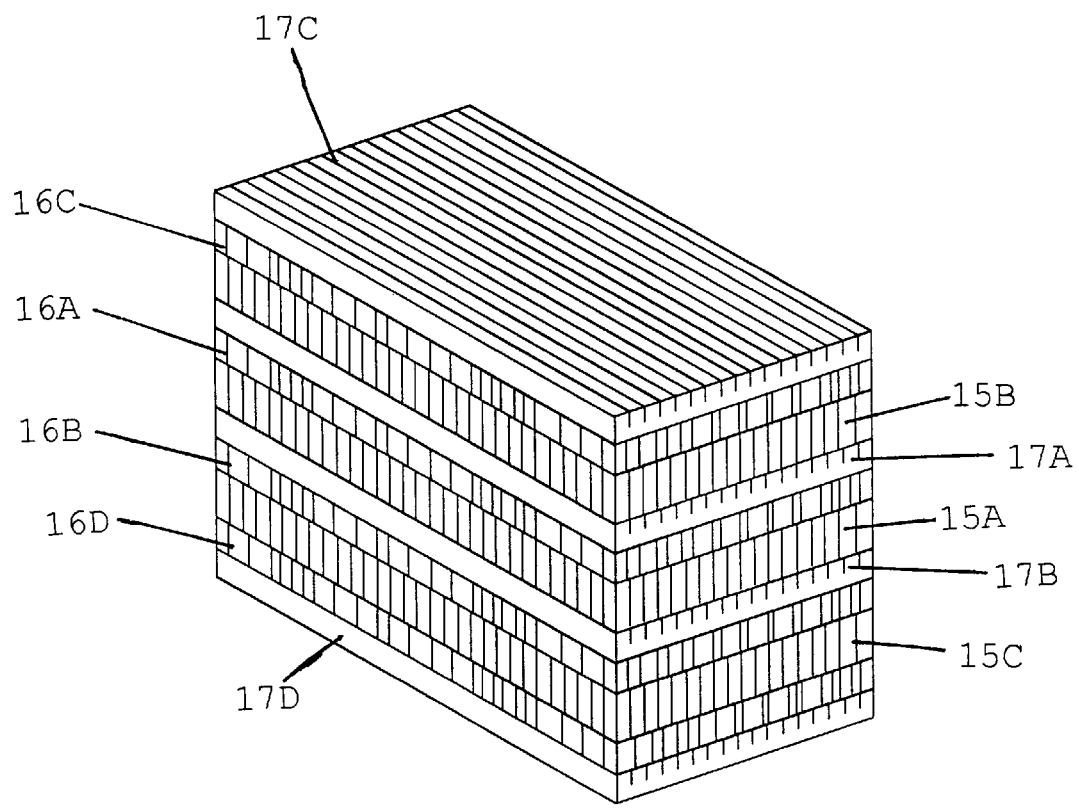
FIG. 3 is a perspective view of an embodiment of the layered composite construction material.
Figure 4:
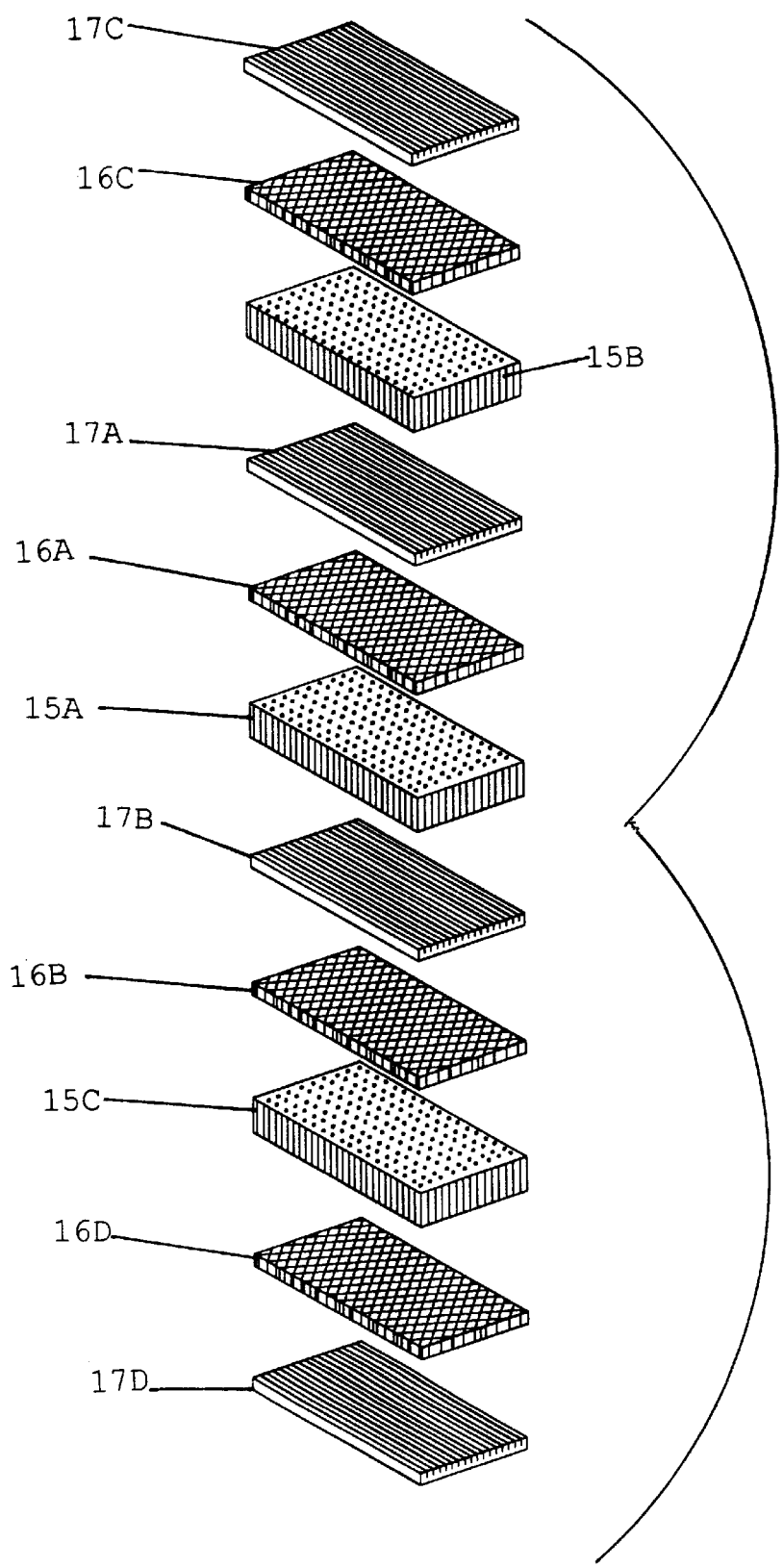
FIG. 4 is an exploded perspective view of an embodiment of the layered composite construction material.

Referring to the drawings in FIGS. 1–4, in particular, the layered composite construction material comprises a pair of distinct outer layers 17A,17B of material each having a variable thickness of less than two inches and preferably comprising a first orientation of finespun filaments of glass molded into a mat which is essentially continuous strand fiberglass mat, the outer layers 17A,17B being opposedly disposed and being separated by a pair of distinct intermediate sandwich layers 16A,16B of material each comprising a second orientation of finespun filaments of glass woven together to form woven roving fiberglass mat and having a variable thickness of less than two inches and each being disposed adjacent to a respective one of the outer layers 17A,17B which are further separated by at least one distinct internal layer 15A of material having a variable thickness of less than two inches but essentially being relatively thicker than the outer and intermediate sandwich layers 16A, 16B and essentially comprising a third orientation of finespun filaments of glass which are formed into a spun fiberglass blanket wherein the filaments of glass are longitudinally disposed perpendicular to the other layers of the construction material and are further disposed essentially parallel to one another throughout the blanket. To bind and hold these layers together, a binder preferably polyurethane rigid foam is permeated evenly through the layers of material. This foam generally serves as a binder to keep the layers substantially fixedly attached to one another.

Further, the at least one distinct internal layer 15A of material sandwiched between the two intermediate sandwich layers 16A,16B of material can include a plurality of distinct internal layers 15A,15B,15C which further comprises a plurality of the spun fiberglass blanket layers each being separated by a pair of relatively thin layers 16A–C, 17A–C of material, one of which comprises a continuous strand fiberglass mat and the other of which comprises a woven roving fiberglass mat with a particular spun fiberglass blanket layer 17A–D being disposed adjacent to a respective intermediate sandwich layer 16A–D. The spun fiberglass blanket layers 17A–D are essentially sponge-like materials with the fiberglass filaments being arranged so that the fiberglass filaments cannot migrate or accumulate in the corners of the particular layers as often happens to filaments which are disposed parallel to the other layers. The orientation of the fiberglass filaments which make up the spun fiberglass blanket layers 17A–D facilitates the evenly dispersal of the polyurethane rigid foam throughout the immediate layers for effective binding of all the layers.

As previously stated, this layered composite construction material has a tensile strength of approximately 200 percent of that of similar plywood sheets. In fact, tests were conducted not only on panels comprising the two embodiments of this material but also a Balsa panel and a plywood panel. The tests were conducted as to load capacity and strain/deflection. A 60,000 pound capacity Tinius Olsen universal test machine was used in the test. The data outputs received were connected to an analog-to-digital conversion system installed in a 80286 based computer. Strength and modulus values were obtained from post processing calculation routines. The test panels were cut along the zero degree reinforcement axis. A four point bending apparatus was used for evaluation of flexural strength and modulus. The support span was set at 18 inches with the loading span set to four inches. The test panels were cut to four and one half inches in width. Load was applied through the loading noses at a constant rate of 0.2 inches per minute. The deflection during the loading process was tracked by a deflectometer, which measured deflection at the sample midpoint under the loading nose. All failures occurred in core shear within the region between a loading nose and outer support. Below is Table 1 which shows the results of the load capacity and the stiffness of each panel:

TABLE 1

|  | Panel A<br>Balsa Core | Panel B<br>Plywood Core | Panel C<br>1st Emb | Panel D<br>2nd Emb |
|---|---|---|---|---|
| Modulus (mpsi) | 0.668 | 0.361 | 0.361 | 0.385 |
| Load Cap. (lb/in) | 1,424 | 863 | 1,867 | 1,787 |
| Stiffness (lb-in$^2$) | 2.956E + 06 | 1.634E + 06 | 1.968E + 06 | 2.028E + 06 |

The two embodiments of the present invention scored the highest as to load capacity. Further, both embodiments of the present invention were found to be stiffer than the plywood panel and not as stiff as the Balsa panel.

Below are Tables 2–5 which illustrate the results of the flexural strength per modulus:

TABLE 2

PANEL A

| Width (Inch) | Depth (Inch) | Flexural Modulus (psi) | Maximum Load (lb.) | Load Per Inch Width (lb/in) | Stiffness (lb-in$^2$) |
|---|---|---|---|---|---|
| 4.375 | 2.297 | 6.511E + 05 | 6,972 | 1,594 | 2,874,636 |
| 4.342 | 2.306 | 6.848E + 05 | 5,449 | 1,255 | 3,038,238 |

TABLE 3

PANEL B

| Width (Inch) | Depth (Inch) | Flexural Modulus (psi) | Maximum Load (lb.) | Load Per Inch Width (lb/in) | Stiffness (lb-in$^2$) |
|---|---|---|---|---|---|
| 4.356 | 2.305 | 3.575E + 05 | 3,679 | 845 | 1,588,308 |
| 4.330 | 2.338 | 3.645E + 05 | 3,817 | 882 | 1,680,672 |

TABLE 4

PANEL C

| Width (Inch) | Depth (Inch) | Flexural Modulus (psi) | Maximum Load (lb.) | Load Per Inch Width (lb/in) | Stiffness (lb-in$^2$) |
|---|---|---|---|---|---|
| 4.449 | 2.465 | 3.530E + 05 | 8,270 | 1,859 | 1,959,071 |
| 4.300 | 2.465 | 3.682E + 05 | 8,065 | 1,876 | 1,976,725 |

TABLE 5

PANEL D

| Width (Inch) | Depth (Inch) | Flexural Modulus (psi) | Maximum Load (lb.) | Load Per Inch Width (lb/in) | Stiffness (lb-in$^2$) |
|---|---|---|---|---|---|
| 4.364 | 2.459 | 3.758E + 05 | 7,705 | 1,766 | 2,032,035 |
| 4.348 | 2.419 | 3.949E + 05 | 7,863 | 1,808 | 2,023,893 |

As illustrated in Tables 2–5, the two embodiments of present invention have a flexural strength very comparable to the plywood panel and further have maximum load bearings greater than either of the balsa panel or the plywood panel, in fact, more than twice that of the plywood panel. The two embodiments of the present invention are stiffer than the plywood panel but not as stiff as the Balsa panel.

The layered composite construction material has properties, as shown in Tables 1–5, which can be made in a wide variety of sizes and thicknesses and which can be formed and milled according to a user's specifications for unibody construction. Some uses of this construction material include building components for building structures, rail car boxes, boats, campers including motorhomes, refrigeration means, replacement of wood and cement ties for supporting railroad rails, telephone poles, etc. Further, the layered composite construction material does not use hazardous materials or processes and all scrap can be ground and reused to eliminate waste. Also, this construction material virtually does not expand nor contract due to temperature changes. Skins of metal, plastic, ceramic or wood can be applied to either or both sides of the product, and one of the most important features of this construction material is that it has an indefinite or unlimited lifespan.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A layered composite construction material comprising:
   a pair of opposed distinct outer layers of material comprising a first orientation of finespun filaments of glass which includes a continuous strand of fiberglass mat;
   a pair of distinct intermediate sandwich layers of material separating said pair of opposed outer layers and each being disposed adjacent to a respective one of said pair of opposed distinct outer layers of material and comprising a second orientation of finespun filaments of glass which includes woven fiberglass mat;
   at least one distinct internal layer of material sandwiched between said pair of distinct intermediate sandwich layers of material and comprising a third orientation of finespun filaments of glass; and
   a foam binder permeated throughout all said distinct layers of material to securely bind together all said distinct layers.

2. A layered composite construction material as described in claim 1, wherein said woven fiberglass mat is essentially approximately eighteen ounce woven roving fiberglass mat.

3. A layered composite construction material as described in claim 1, wherein said third orientation of finespun filaments of glass includes spun fiberglass formed into essentially a blanket.

4. A layered composite construction material as described in claim 3, wherein said finespun filaments of glass of said third orientation are longitudinally disposed perpendicular to said pair of distinct intermediate sandwich layers to facilitate dispersal of said binder and to essentially prevent migration of said finespun filaments to edges of said at least one distinct internal layer.

5. A layered composite construction material as described in claim 4, wherein said foam is essentially rigid polyurethane foam.

6. A layered composite construction material as described in claim 1, wherein said at least one distinct internal layer of material further comprises a plurality of distinct internal layers of material sandwiched between said distinct intermediate sandwich layers of material.

7. A layered composite construction material as described in claim 6, wherein said plurality of distinct internal layers comprises a plurality of internal layers each comprising said third orientation of said finespun filaments of glass.

8. A layered composite construction material as described in claim 7, wherein said third orientation of said finespun filaments of glass includes spun fiberglass formed in a blanket.

9. A layered composite construction material as described in claim 8, wherein a particular layer of said spun fiberglass blanket is disposed adjacent to a respective one of said pair of distinct intermediate sandwich layers.

10. A layered composite construction material as described in claim 9, wherein said layers of spun fiberglass blanket are separated from each other by a pair of distinct layers of material.

11. A layered composite construction material as described in claim 10, wherein one of said pair of distinct layers includes said first orientation of said finespun filaments of glass and the other of said pair of distinct layers includes said second orientation of said finespun filaments of glass.

12. A layered composite construction material as described in claim 11, wherein said first orientation of said finespun filaments of glass includes a continuous strand fiberglass mat.

13. A layered composite construction material as described in claim 11, wherein said second orientation of said finespun filaments of glass includes a woven roving fiberglass mat.

14. A layered composite construction material as described in claim 9, wherein each said spun fiberglass blanket includes filaments which are longitudinally disposed perpendicular to said pair of distinct intermediate sandwich layers of material.

* * * * *